(12) United States Patent
Groeller et al.

(10) Patent No.: US 7,973,250 B2
(45) Date of Patent: Jul. 5, 2011

(54) CABLE CONDUIT AND METHOD OF MOUNTING A CABLE RELATIVE TO A WALL OPENING

(75) Inventors: Charles J. Groeller, Orefield, PA (US); Wayne A. Harwood, Allentown, PA (US)

(73) Assignee: Mack Trucks, Inc., Greensboro, NC (US)

( * ) Notice: Subject to any disclaimer, the term of this patent is extended or adjusted under 35 U.S.C. 154(b) by 408 days.

(21) Appl. No.: 12/225,559

(22) PCT Filed: Apr. 3, 2006

(86) PCT No.: PCT/US2006/012057
§ 371 (c)(1),
(2), (4) Date: Sep. 24, 2008

(87) PCT Pub. No.: WO2007/114810
PCT Pub. Date: Oct. 11, 2007

(65) Prior Publication Data
US 2009/0057005 A1 Mar. 5, 2009

(51) Int. Cl.
*H02G 3/08* (2006.01)
(52) U.S. Cl. ...... 174/481; 174/480; 174/68.1; 174/68.3; 174/72 R; 248/68.1; 138/157
(58) Field of Classification Search .................. 174/480, 174/481, 482, 488, 490, 495, 68.1, 68.3, 174/72 R, 72 A, 53, 57, 58; 220/3.2–3.9, 220/4.02; 248/68.1; 138/157–163, 109, 155; 285/179–183
See application file for complete search history.

(56) References Cited

U.S. PATENT DOCUMENTS

| | | | |
|---|---|---|---|
| 3,151,905 A * | 10/1964 | Reuther | 174/153 G |
| 3,986,228 A | 10/1976 | Dowse | |
| 5,016,842 A | 5/1991 | Suzuki et al. | |
| 5,016,924 A * | 5/1991 | Lin | 285/179 |
| 5,211,695 A | 5/1993 | Dowler | |
| 5,911,450 A | 6/1999 | Shibata et al. | |
| 6,011,221 A * | 1/2000 | Lecinski et al. | 174/72 A |
| 6,069,317 A * | 5/2000 | Wagganer | 174/650 |
| 6,114,631 A * | 9/2000 | Gretz | 174/651 |
| 6,297,449 B1 | 10/2001 | Dagtekin | |
| 6,431,642 B2 * | 8/2002 | Sora et al. | 174/153 G |
| 6,878,879 B2 | 4/2005 | Takahashi et al. | |
| 7,312,407 B2 * | 12/2007 | Case | 174/650 |
| 7,435,905 B1 * | 10/2008 | Elder | 174/92 |
| 7,507,912 B1 * | 3/2009 | Sempliner et al. | 174/153 G |
| 7,582,835 B2 * | 9/2009 | Pyron | 174/481 |

* cited by examiner

*Primary Examiner* — Angel R Estrada
(74) *Attorney, Agent, or Firm* — Martin Farrell; Michael Pruden

(57) ABSTRACT

A cable harness for passing one or more cables through an opening the wall includes a cable conduit including a generally S-shaped channel defined by an inner surface of a first shell portion and an inner surface of a second shell portion attached to the first shell portion and a least one cable disposed in the cable conduit. A method of mounting a cable relative to an opening in a wall is also disclosed.

16 Claims, 5 Drawing Sheets

CABLE CONDUIT AND METHOD OF MOUNTING A CABLE RELATIVE TO A WALL OPENING

The present invention relates to a cable conduit and, more particularly, to a cable conduit of the type for mounting cables relative to an opening in a wall.

When cables such as electrical or pneumatic cables must extend through a wall, such as the wall or bulkhead of a truck cab, it is desirable to secure them in position so they are not accidentally pulled in or out relative to the wall. Ordinarily, the cables are secured by a one-piece molded plastic or rubber sleeve or grommet with flanges that fit around edges of the wall. The sleeve is typically secured in place relative to an opening in the wall, and then the cables are fed through the sleeve. This can be a time-consuming process and often results in the cables receiving rough treatment that can lead to damage. It is desirable to provide a cable conduit that facilitates mounting a cable relative to a wall opening.

According to an aspect of the present invention, a cable conduit for passing one or more cables through an opening in a wall comprises a generally S-shaped channel defined by an inner surface of a first shell portion and an inner surface of a second shell portion attachable to the first shell portion.

According to another aspect of the present invention, a cable harness for passing one or more cables through an opening in a wall comprises a cable conduit comprising a generally S-shaped channel defined by an inner surface of a first shell portion and an inner surface of a second shell portion attached to the first shell portion and at least one cable disposed in the cable conduit.

According to yet another aspect of the present invention, a method of mounting a cable relative to an opening in a wall comprises positioning at least one cable in a generally S-shaped channel of a cable conduit defined by an inner surface of a first shell portion and an inner surface of a second shell portion attachable to the first shell portion, and partially extending the cable conduit through the opening so that a first end of the cable is disposed on one side of the wall and a second end of the cable is disposed on another side of the wall.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
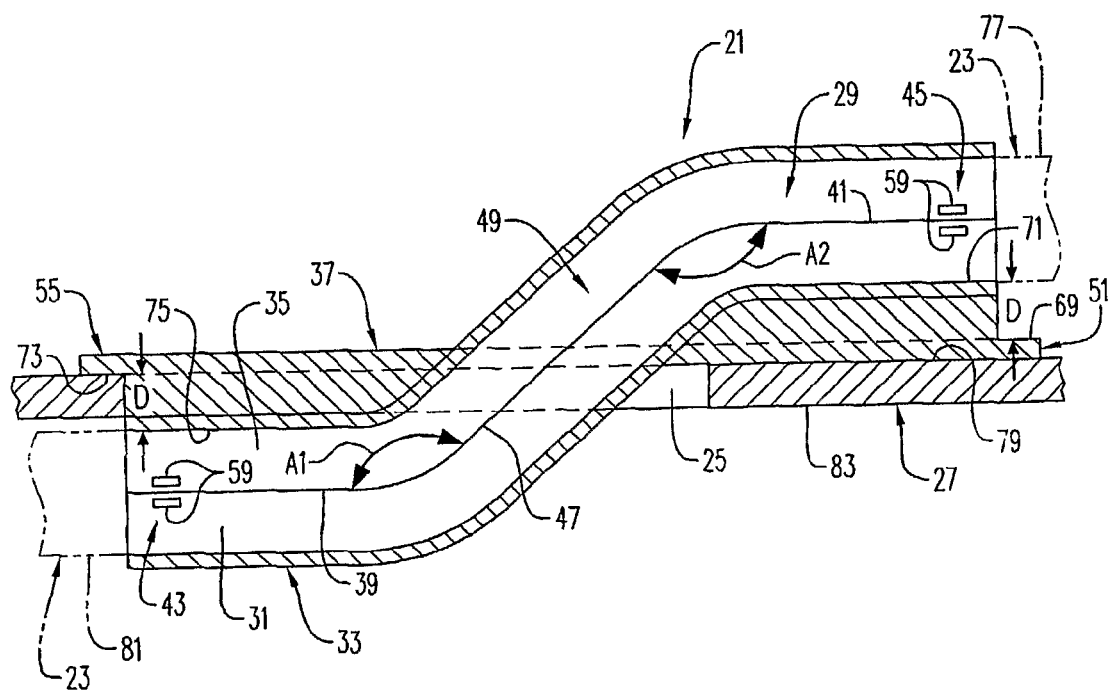
FIG. 1 is a side, cross-sectional view of a cable conduit according to an embodiment of the present invention.

FIG. 1 shows an embodiment of a cable conduit 21 for passing one or more cables 23 (shown in phantom in FIG. 1), typically one or more cable bundles, through an opening 25 in a wall 27 or bulkhead. The cables 23 can be any type of cable, for example, pneumatic, hydraulic, or electrical cables, or some combination of two or more such cable types. While it is presently envisioned that the present invention will have particular application in passing cables through vehicle walls and bulkheads such as cables passing from inside to outside truck cabs, it will be appreciated that the invention has applications in countless other areas where it is necessary to pass cables through openings in walls.

Figure 2:
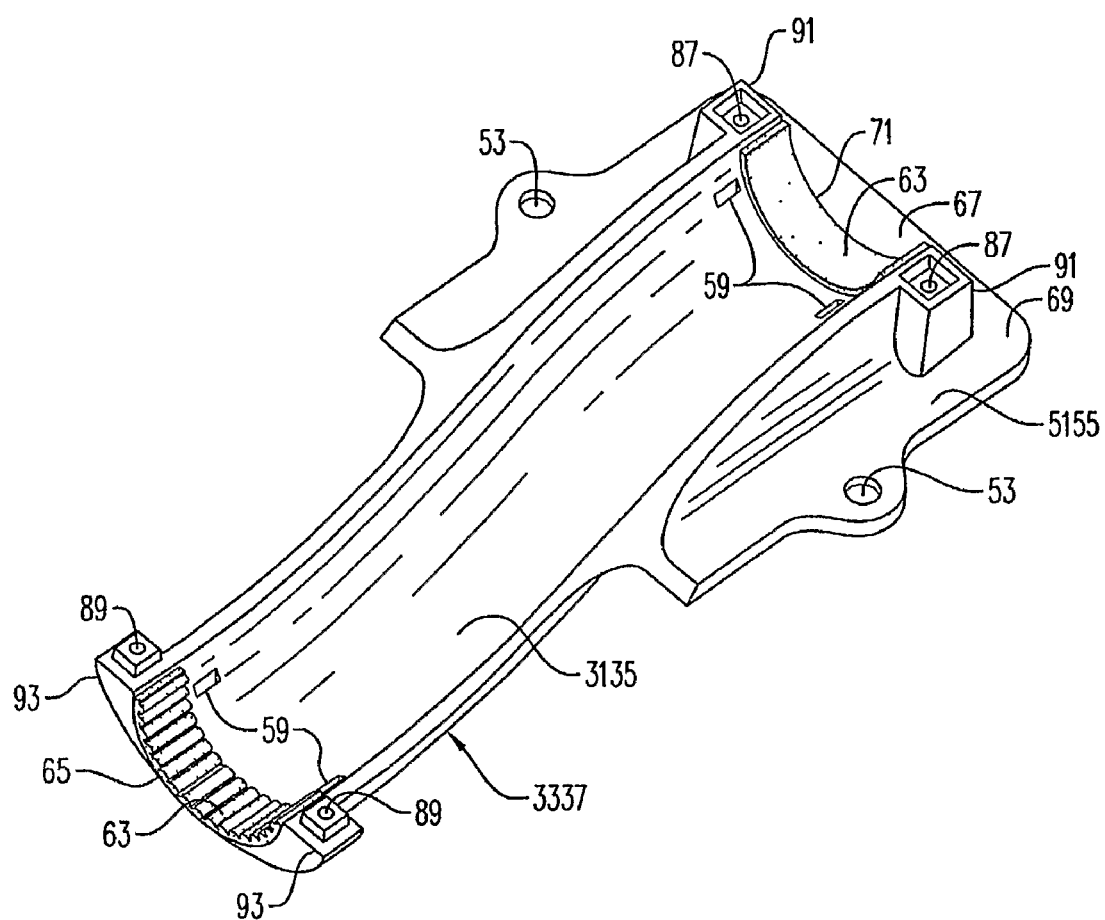
FIG. 2 is a perspective view of a shell portion of a cable conduit according to an embodiment of the present invention.

The cable conduit 21 can comprise a generally S-shaped channel 29 defined by an inner surface 31 of a first shell portion 33 and an inner surface 35 of a second shell portion 37 attachable to the first shell portion. The shell portions 33 and 37 can be made out of any suitable material. For example, the shell portions 33 and 37 may be made of a molded plastic material, formed from pressed metallic plates, etc. The first and second shell portions 33 and 37 can be identical. FIG. 2 shows a shell portion 3337 that can function as either a first or a second shell portion 33 or 37. The first and second shell portions 33 and 37 do not, however, have to be identical parts.

Central axes 39 and 41 of a first end portion 43 of the channel 29 and a second end portion 45 of the channel can lie in parallel planes. In the embodiment shown in FIGS. 1 and 3A-3C, the central axes 39 and 41 of the first end portion 43 of the channel 29 and the second end portion 45 of the channel are parallel. Of course, depending upon routing requirements, embodiments wherein central axes of the end portions of the channel are not in parallel planes or non-parallel can be provided. It will also be appreciated that the end portions of the channel need not have straight axes and that the end portions can be curved.

In the embodiment of FIG. 1, a central axis 47 of a transition portion 49 between the first end portion 43 and the second end portion 45 defines oblique angles A1 and A2 with the central axes 39 and 41 of the first end portion 43 and the second end portion 45. In the illustrated embodiment, the oblique angles A1 and A2 are the same, however, it will be appreciated that the angles can differ.

A first shell flange 51 can extend from the first shell portion 33. The first shell flange 51 facilitates attachment of the first shell portion 33 to the wall 27, thereby facilitating attachment of the cable conduit 21 as a whole to the wall. As seen in FIGS. 2-3C, the first shell flange 51 can have holes or openings 53 for receiving fasteners 60 (FIGS. 4A-4B) such as bolts or screws, or can be fastened in any other suitable manner, such as by adhesive or by prongs (not shown) molded with the first shell portion that mate with corresponding holes in the wall 27.

Figure 4A:
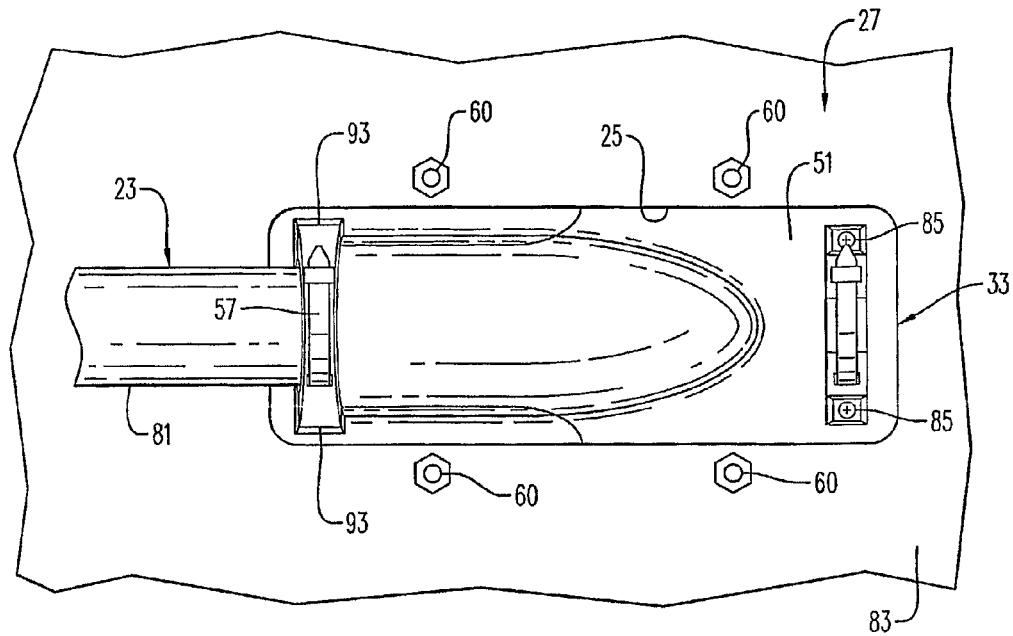
FIG. 4A is a bottom view and FIG. 4B is a perspective top view of a cable conduit mounted to a wall according to an embodiment of the present invention.
Figure 4B:
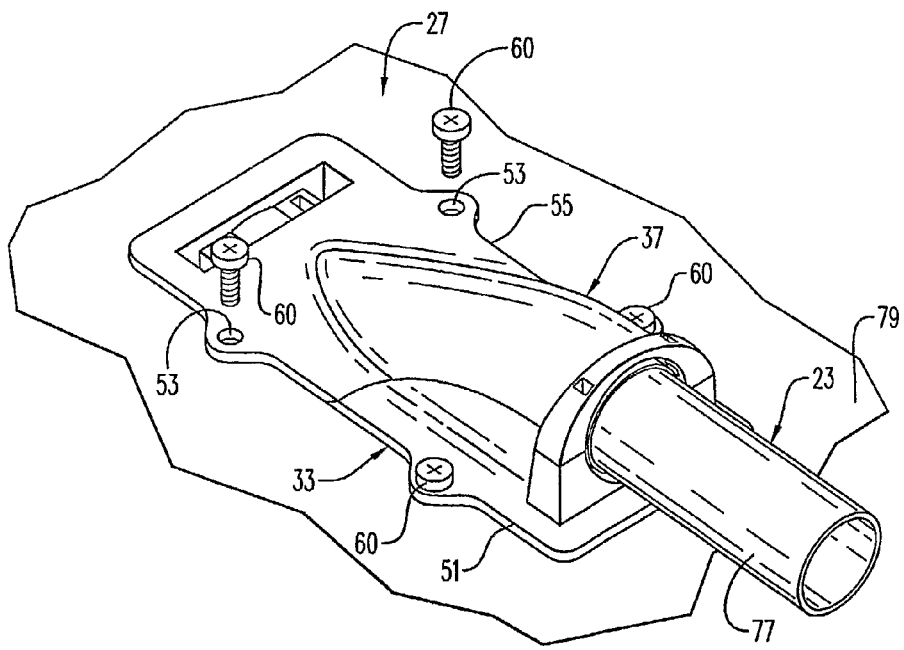

While the cable conduit 21 can be supported relative to the wall in any suitable fashion, such as by the first shell flange 51 alone, a second shell flange 55 may also be provided and can extend from the second shell portion 37 and, like the first shell flange 51, can be attachable to the wall 27. The first shell flange 51 and the second shell flange 55 can be attachable to the same side of the wall 27 as shown in FIG. 1. While providing flanges 51 and 55 that are attachable to the same side of the wall 27 is presently believed to facilitate installation of a preassembled cable conduit 21 relative to an opening 25 in a wall, if multiple flanges are provided, they can be attachable to opposite sides of the wall. As seen in FIGS. 4A and 4B, fasteners 60 can extend through holes 53 in both flanges 51 and 55 from a single side 77 of the wall 27 so that the flanges and the heads of the fasteners are disposed on a single side of the wall as seen in FIG. 4B, while the opposite ends of the fasteners can extend into or through the wall as seen in FIG. 4A. As seen in FIG. 2, the shell portion 3337 that is identical to a mating shell portion can have a flange 5155. For convenience, except where otherwise indicated, reference numbers used in connection with features of the shell portions 33 and 37 shown in the other Figures will be used to describe corresponding features of the shell portion 3337 of FIG. 2.

Figure 3A:
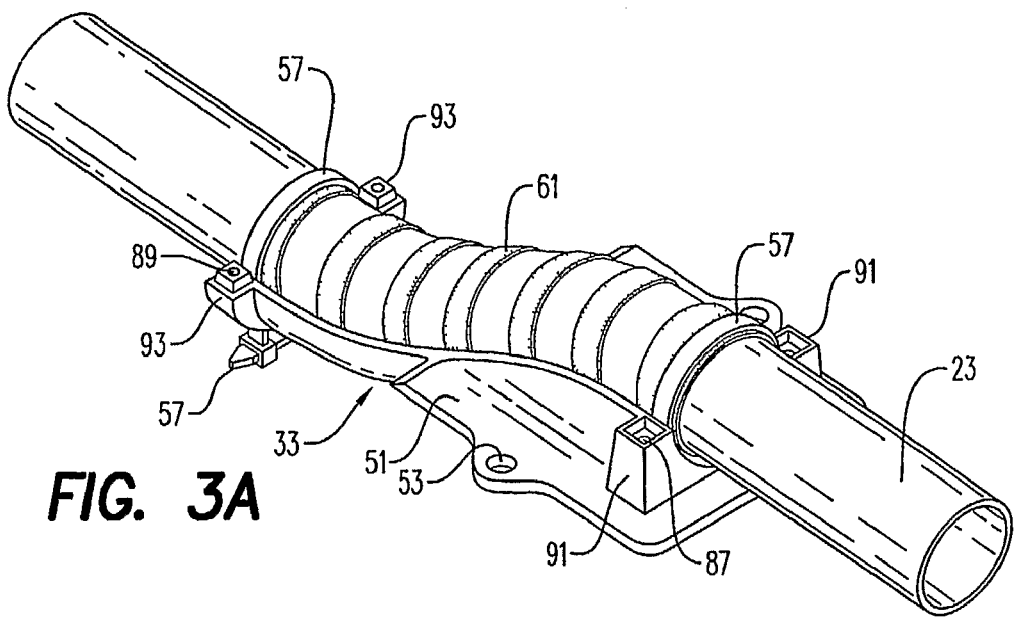
FIG. 3A is a perspective view and FIGS. 3B-3C are partially exploded perspective views of phases in the assembly of a cable conduit according to an embodiment of the present invention.
Figure 3B:
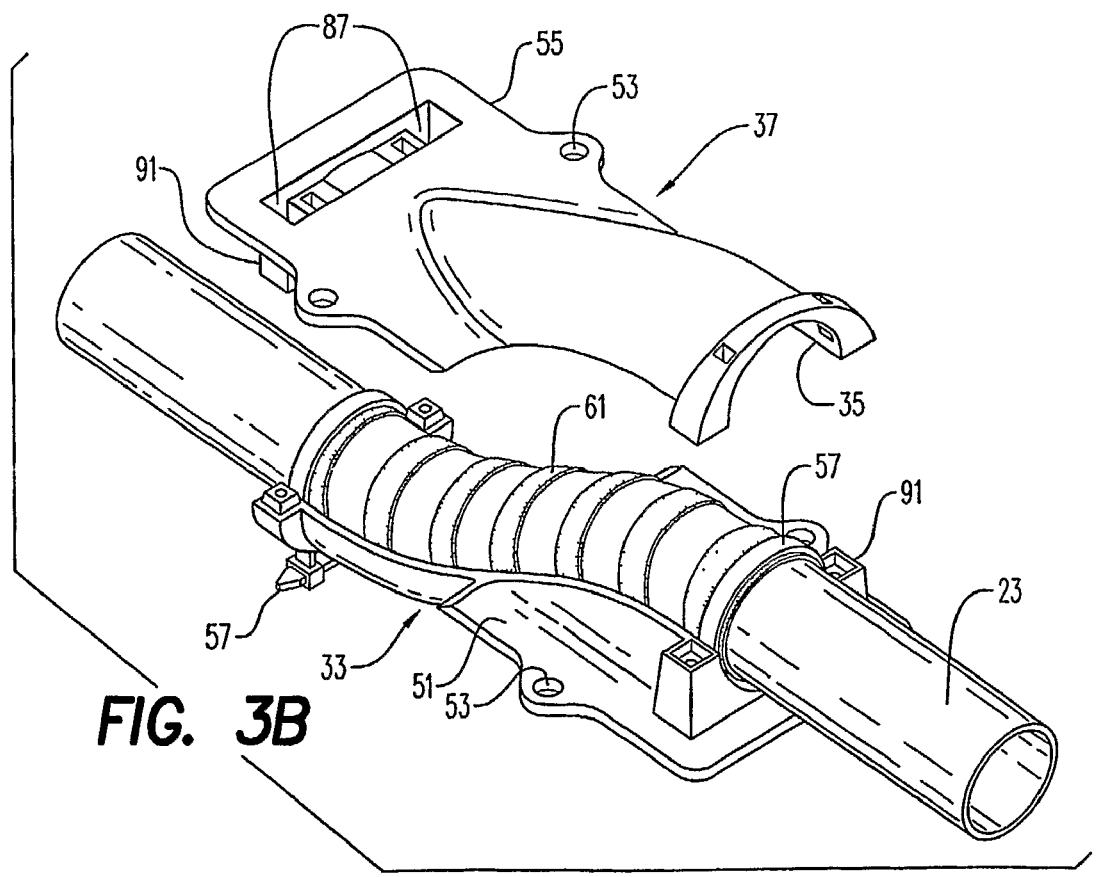
Figure 3C:
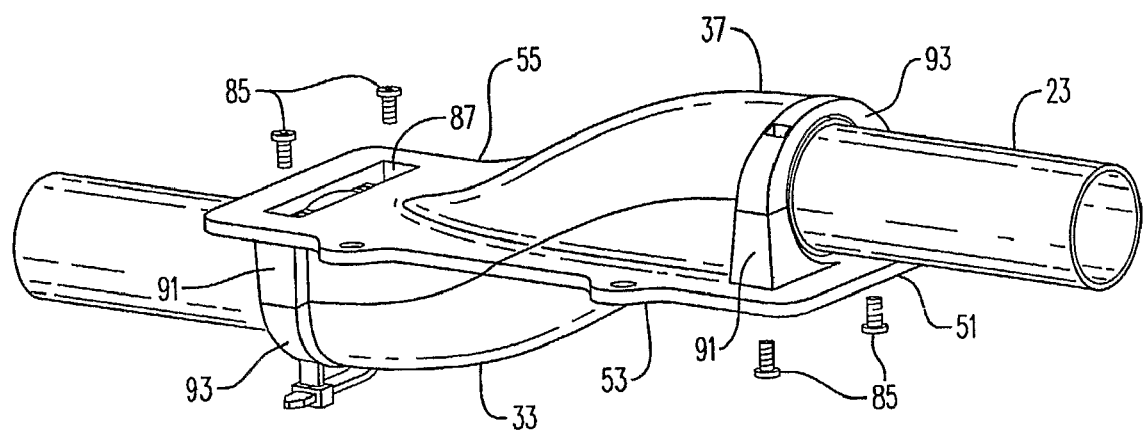

As seen in FIGS. 3A, 3B, 3C, and 4A, wrapping members 57 can be provided for securing the cable 23 in a portion of the channel 29 (FIG. 1) defined by one of the first shell 33 and the second shell 35. FIGS. 3A, 3B, and 4A show wrapping members 57 arranged to secure the cable 23 in the inner surface 31 of the channel 29 formed by the first shell portion 33. The wrapping members 57 can be plastic "tie wraps" that extend around the cable 23 and through holes 59 (e.g., FIGS. 1 and 2) extending through the portion of the channel 29 formed by the inner surface 31 of the first shell portion 33.

As seen in FIGS. 3A-3B, insulation material can be provided inside the channel 29. The insulation material can insulate against matters such as sound and shock. For example, the insulation material can be in the form of sound baffle tape 61 wrapped around the cable 23. The insulation material can alternatively or in addition include material such as sound block material 63 secured at ends of the channel 29, such as is shown in FIG. 2, showing a sound block material secured at the ends 65 and 67 of the inner surface 3135 of the shell portion 3337.

In the embodiment shown in FIG. 1, where the first shell portion 33 and the second shell portion 37 are identical, a top surface 69 of the first shell flange 51 and the bottom point 71 of the inner surface 31 of the first shell portion 33 are separated by a distance D that will ordinarily be at least as large as the thickness of the wall 27. Likewise, the bottom surface 73 of the second shell flange 55 is separated from the top point 75 of the inner surface 35 of the second shell portion 37 by a distance at least as large as the thickness of the wall 27. In this way, regardless how the cable conduit 21 is secured to the wall 27, i.e., with either the first shell portion 33 or the second shell portion 37 being the "lower" or "upper" shell portion (first shell portion 33 shown as "lower" portion in FIG. 1), the cable conduit 21 will provide sufficient clearance so that the wall 27 does not interfere with the cable. Of course, if the shell portions are not identical, they may be designed in any other suitable fashion, such as so that only one shell portion has a distance between a flange and the bottom point of the inner surface of the shell portion so that the cable exits the cable conduit substantially adjacent the wall.

The cable conduit 21 facilitates manufacturing a cable harness comprising the conduit 21 and cables 23 together, and subsequently installing the pre-assembled cable harness relative to an opening 25 in a wall 27. Thus, the cable harness can, for example, be made at one location and shipped to another location for installation. The opening 25 can be in any suitable shape, such as the rectangular shape shown in FIG. 4A, or it can be formed to more closely conform to the shape of the shell portion that extends through the opening.

As seen in FIG. 1, in a method of mounting a cable 23 relative to an opening 25 in a wall 27, at least one cable is positioned in a generally S-shaped channel 29 of a cable conduit defined by an inner surface 31 of a first shell portion 33 and an inner surface 35 of a second shell portion 37 attachable to the first shell portion. The cable conduit 21 is partially extended through the opening 25 so that a first end 77 of the cable 23 is disposed on one side 79 of the wall 27 and a second end 81 of the cable is disposed on another side 83 of the wall. The cable conduit 21 is ordinarily secured to the wall 27, such as by fasteners 60 (FIGS. 4A-4B) through holes 53 in flanges 51 and 55 of the first and/or second shells 31 and/or 35. The cable conduit 21 is ordinarily partially extended through the opening 25 subsequent to positioning the cable 23 in the channel 29 of the cable conduit, i.e., the cable conduit and cable are preassembled to form a cable harness prior to installation of the cable harness relative to the opening in the wall.

The shell portions 33 and 37 can be secured together in any suitable fashion. They may, for example, be secured by adhesive, by wrapping members such as tie wraps, or, as shown in FIGS. 3C and 4A, by fasteners 85 such as screws or bolts that extend through through holes 87 (FIGS. 2, 3A, 3B) in one shell portion into internally threaded holes 89 (FIGS. 2 and 3A) in the other shell portion. The through holes 87 and the internally threaded holes 89 can be provided in any suitable location, such as in protruding portions 91 and 93, respectively.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A cable conduit for passing, supporting, and guiding one or more cables through an opening in a wall, comprising:
   a first shell having a first end and an opposite second end; and,
   a second shell having a first end and an opposite second end;
   the second shell being attachable along its length to the first shell with the first end of the second shell mating with the second end of the first shell, inner surfaces of the first shell and second shell defining a generally S-shaped channel having a first end portion laterally offset from a second end portion, central axes of the first end portion and the second end portion lying in parallel planes and joined by a central portion oblique to the first end portion and second end portion,
   the first shell including at the first end an outwardly extending first shell mounting flange parallel to the central axis of the first end portion, wherein the first shell mounting flange is attachable to a wall at an opening in the wall so that S-shaped channel traverses the opening with the central portion disposed in the opening.

2. The cable conduit as set forth in claim 1, wherein the central axes of the first end portion of the channel and the second end portion of the channel are parallel.

3. The cable conduit as set forth in claim 1, the second shell further comprising a second shell mounting flange extending from the second shell and parallel to the first shell mounting flange, the second shell mounting flange being attachable to a wall.

4. The cable conduit as set forth in claim 3, wherein the first shell mounting flange and the second shell mounting flange are disposed in a common plane and are attachable to a common wall surface.

5. The cable conduit as set forth in claim 1, comprising at least one wrapping member for securing at least one cable in a portion of the channel defined by one of the first shell and the second shell.

6. The cable conduit as set forth in claim 5, wherein the at least one wrapping member extends through holes extending through the portion of the channel.

7. The cable conduit as set forth in claim 5, comprising insulation inside the channel.

8. The cable conduit as set forth in claim 7, wherein the insulation is disposed at least proximate end portions of the channel.

9. The cable conduit as set forth in claim 1, comprising a plurality of wrapping members for securing one or more cables in the portion of the channel defined by one of the first shell and the second shell.

10. The cable conduit as set forth in claim 1, comprising insulation inside the channel, 11. The cable conduit as set forth in claim 10, wherein the insulation is disposed at least proximate end portions of the channel.

12. The cable conduit as set forth in claim 1, wherein the first and second shell portions are identical.

13. A method of mounting a cable relative to an opening in a wall, comprising:
    providing a cable conduit comprising a first shell having an inner surface and a second shell having an inner surface, the second shell attachable along its length to the first shell to define a generally S-shaped channel, the S-shaped channel having a first end portion, a second end portion laterally offset and parallel to the first end portion, and a central portion oblique to the first end portion and second end portion, the cable conduit having at least one flange attachable to a wall;
    positioning at least one cable in the S-shaped channel;
    positioning the cable conduit relative to an opening in a wall with the first end portion on one side of the wall and the second end portion on an opposite side of the wall, and the central portion extending through the opening, the flange being in mounting contact with the wall and a first end of the cable disposed on one side of the wall and a second end of the cable is disposed on an opposite side of the wall.

14. The method of mounting set forth in claim 13, comprising fastening the flange to the wall.

15. The method of mounting set forth in claim 13, wherein the cable conduit is partially extended through the opening subsequent to positioning the at least one cable in the S-shaped channel.

16. The method of mounting set forth in claim 13, wherein the at least one flange is formed on the first shell at the first end parallel to a central axis of the first end portion.

\* \* \* \* \*